United States Patent [19]

Taniguchi et al.

[11] Patent Number: 5,109,690

[45] Date of Patent: May 5, 1992

[54] TENSION APPARATUS

[75] Inventors: Toshihisa Taniguchi, Kariya; Mituyuki Hayashi, Nishio; Masahiko Sakai, Takahama, all of Japan

[73] Assignee: Nippondenso Co., Ltd., Kariya, Japan

[21] Appl. No.: 528,888

[22] Filed: May 29, 1990

[30] Foreign Application Priority Data

May 30, 1989 [JP] Japan .................. 1-136859

[51] Int. Cl.⁵ ............... B21B 15/00; B65H 59/22; B65H 20/00
[52] U.S. Cl. .......................... 72/206; 140/1; 242/151; 226/182
[58] Field of Search ............. 29/605; 72/66, 151, 72/183, 199, 206, 224, 226; 140/1, 92.1, 92.2, 115, 140, 149; 242/47.01, 82, 147 R, 151; 226/182

[56] References Cited

U.S. PATENT DOCUMENTS

| | | | |
|---|---|---|---|
| 2,072,831 | 3/1937 | Solenberger | 72/199 |
| 2,362,920 | 11/1944 | Moore | 242/151 |
| 2,603,343 | 7/1952 | Payne | 226/182 |
| 2,738,144 | 3/1956 | Honig | 242/151 |
| 2,909,341 | 10/1959 | Kingsley | 242/151 |
| 3,648,506 | 3/1972 | Caltagirone | 72/206 |
| 3,885,789 | 5/1975 | Deluty et al. | 242/147 R |
| 4,204,417 | 5/1980 | McVoy, Jr. | 72/224 |

FOREIGN PATENT DOCUMENTS 62-140066 9/1987 Japan .
64-2749 1/1989 Japan .

Primary Examiner—Lowell A. Larson
Assistant Examiner—Thomas C. Schoeffler
Attorney, Agent, or Firm—Cushman, Darby & Cushman

[57] ABSTRACT

A tension apparatus for imposing a predetermined tension on a wire-like member which is used for a stator or a alternator. First and second rollers are rotatably supported on a supporting means in such a manner that a space between the first roller and the second roller is smaller than a diameter of the wire-like member. When the wire-like member is passed through a space between a first roller and a second roller, the wire-like member is deformed, and after all, a predetermined tension is imposed on the wire-like member. The tension of the wire-like member can be changed in accordance with the space between the first roller and the second roller.

5 Claims, 5 Drawing Sheets

TENSION APPARATUS

FIELD OF THE INVENTION

The present invention relates to a tension apparatus for imposing a predetermined tension on a wire-like member, the wire-like member having usage for a starter or an alternator.

BACKGROUND OF THE INVENTION

A winding apparatus having a tension apparatus of a prior art is shown in FIG. 11. A wire-like member 38 which is uncoiled from a supply bobbin 30 is several times wound around a primary tension pulley 31 to which a braking torque is added by a magnetism power mechanism (not shown). An end of the wire-like member 38 is wound around a bobbin 37 through a traversable nozzle 36 and auxiliary pulley 32 and 33. A torque T (kgf cm) which is necessary for rotating the primary tension pulley 31 is expressed by a below formula (1).

$$T = T_1 + J \cdot \omega' \quad (1)$$

$T_1$: a braking torque (kgf·cm)
J: an inertia moment of the primary pulley 31
$\omega'$: an anglular accelation of the primary pulley 31
$J \cdot \omega'$ in the formula (1) is a torque which is necessary for altering a rotating speed of the primary pulley 31 in case of an acceleration in the begining of coiling, and a deceleration in the end of coiling. The tension F (kgf) of the wire-like member 38 is expressed by a below formula (2).

$$F = T/(D/2) = (T_1 + J \cdot \omega')/(D/2) \quad (2)$$

D: a diameter of the primary pulley 31

In the formula (2), $T_1/(D/2)$ is a predetermined tension and $J \cdot \omega'/(D/2)$ is a change of the tension.

Since the tension of the wire-like member is decided by a friction resistance between the wire-like member 38 and the primary pulley 31, the wire-like member 38 slips on a surface of the primary pulley 31 if the diameter of the primary pulley 31 becomes smaller. Accordingly, the diameter of the primary pulley 31 becomes about 100 mm; when the predetermined tension is imposed on the wire-like member 38 the diameter thereof is about 0.8 mm. After all, the inertia moment J of the primary pulley 31 becomes about $1 \times 10^{-3}$ (kg·cm·S$^2$).

In the above-mentioned prior art, since the almost part of the work $T_1 \cdot \omega$ (kg·cm/S) which is generated by the braking torque changes the heat in the portion for producing the braking torque, especially the primary pulley 31, the braking torque portion has to be cooled. Accordingly, the primary pulley 31 can not be fast rotated, and the speed for winding wire-like member 38 on the bobbin 37 becomes slow.

Furthermore, the tension apparatus of the prior art needs the shock absorber mechanism, for example the arm 34 which is rotatably fixed on the fulcrum 35, for restraining the change of the tension $J \cdot \omega'/(D/2)$. As shown in FIG. 11, since the arm 34 is arranged between the primary pulley 31 and the guide nozzle 36, the distance between the primary pulley 31 and the nozzle 36 needs at least 80 cm and the tension apparatus becomes large.

SUMMARY OF THE INVENTION

The object of the present invention is to provide a tension apparatus which is small in size. Another object of the present invention is to provide the tension apparatus which does not necessitate the shock absorber mechanism. A further object of the present invention is to provide the tension apparatus which is able to restrain the generation of the heat in the roller.

DETAIL DESCRIPTION OF THE PREFERRED EMBODIMENT

Figure 1:
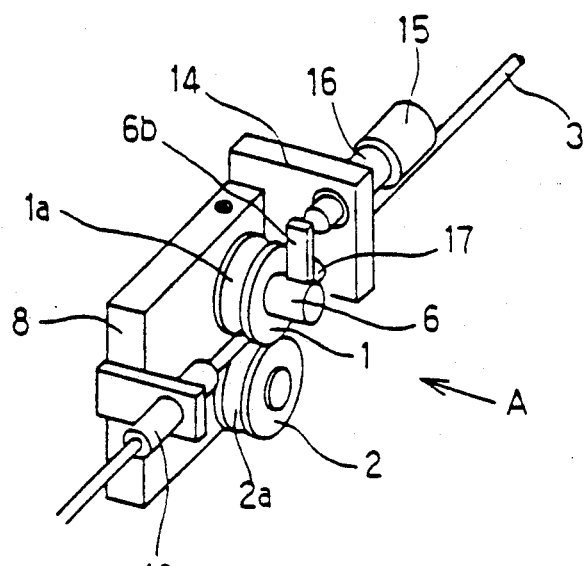
FIG. 1 is a perspective view of a tension apparatus of the first embodiment of the present invention.
Figure 2:
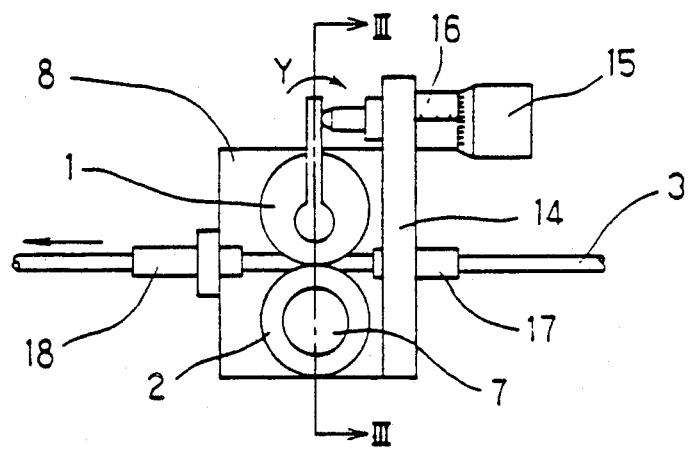
FIG. 2 is a fragmentary view in the direction of the arrow A in FIG. 1.
Figure 3:
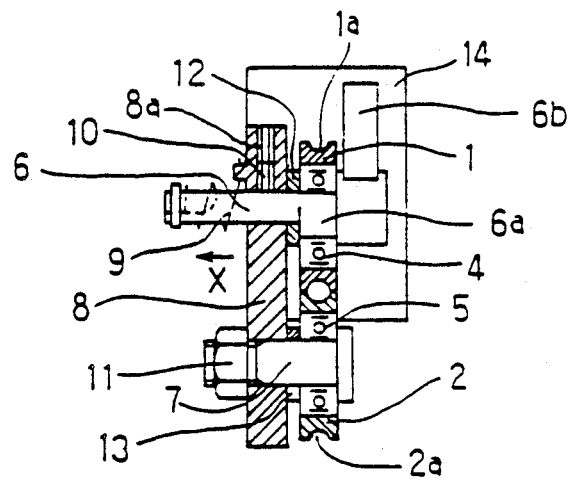
FIG. 3 is a section taken on line III—III in FIG. 2.

The tension apparatus of the first embodiment of the present invention is explained hereinafter by referring FIGS. 1 to 3. A pair of shaping rollers 1 and 2 have a groove 1a and 2a respectively on an outer surface thereof. The grooves 1a and 2a have a curvature in the range 0.5 to 1.3 of a diameter of the wire-like member 3. The wire-like member 3 is coated by an insulating material in order to maintain the electric insurance of the wire-like member. The wire-like member of the present embodiment is used for a rotor coil of an alternator or for a solenoid coil of a magnet switch of a starter. The shaping rollers 1 and 2 are rotatably mounted on a first pin 6 and a second pin 7 respectively through bearings 4 and 5. The first pin 6 is rotatably provided on a plate 8 and one end of which is connected to a coil spring 9. Since the other end of the coil spring 9 is fixed to the plate 8, as shown in FIGS. 2 and 3, the first pin 6 is pushed in the direction of arrows X and Y by means of the coil spring 9.

A cylindrical portion 6a which is formed on the first pin 6 is eccentric by a predetermined amount ΔL to a center of the pin 6. The bearing 4 is provided on the cylindrical portion 6a. Accordingly, a center of the first shaping roller 1 is eccentric to the center of the pin 6a.

A protruding portion 6b is radially outwardly protruded on the end of the pin 6, and the pin 6 rotates in accordance with a rotation of the protruding portion 6b.

A setting means 10 is screwed into an opening 8a which is formed on an upper surface of the plate 8 in such a manner that the setting means 10 pushes the outer surface of the first pin 6.

A second pin 7 is fixed to the plate 8 by a nut 11 so that the first roller 1 faces toward the second roller 2 through a predetermined space.

A spacer 12 is arranged between the plate 8 and the bearing 4 and a spacer 13 is arranged between the plate 8 and the bearing 5.

Figure 4:
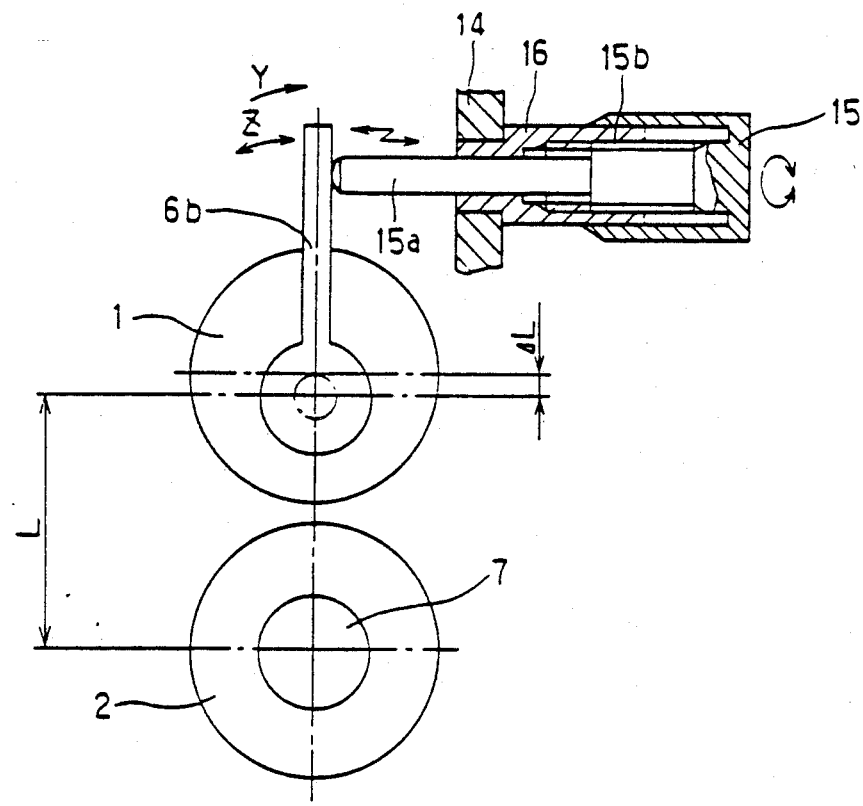
FIG. 4 is a side elevational view, partly in cross section of the deforming part of the tension apparatus shown in FIG. 1.

A cylindrical sleeve 16 is mounted on a supporting portion 14 which is provided to an end of the plate 8. As shown in FIG. 4, the spindle 15 has a pushing portion 15a an end of which is contact with the protruding portion 6b of the first pin 6, and a screw portion 15b which is slidably inserted into an inner surface of the cylindrical sleeve 16 through a screw groove.

Since a scale, as shown in FIG. 2, is marked on an outer surface of the spindle 15 and the cylindrical sleeve 16 respectively, an operator can exactly know a position of the spindle 15. The spindle 15 and the cylindrical sleeve 16 constructs a micrometer.

A first nozzle 17 is connected to the supporting portion 14 and a second nozzle 18 is connected to the plate 8 in such a manner that an axis of the nozzles 17 and 18 locate in the center of the first and second rollers 1 and 2.

Figure 5:
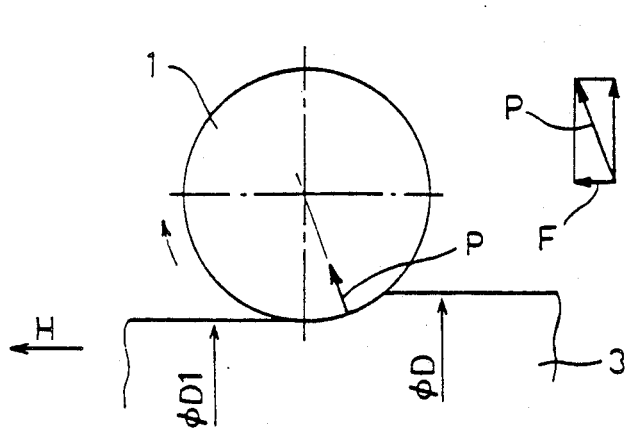
FIG. 5 is a principle view showing how to generate the tension.
Figure 6:
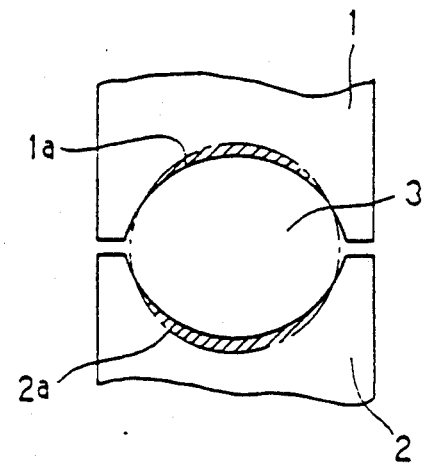
FIG. 6 is an enlarged plan view of rollers and a wire-like member.

A generation of the tension is explained by referring FIG. 5. When the wire-like member 3 is fed toward the direction of an arrow H, the wire-like member 3 is deformed by the first and second shaping rollers 1 and 2 so that the diameter D of the wire-like member 3 alters to the diameter $D_1$ thereof. Accordingly, a pressure P generates on a contact surface between the first roller 1 and the wire-like member 3, and a component which is the arrow H direction of the pressure P becomes the tension. After all, the tension of the wire-like member 3 is regulated by adjusting a deformed amount ($\Phi D - \Phi D_1$) which is shown in a plurality of oblique lines of FIG. 6. In the first embodiment, since the center of the first shaping roller 1 is eccentric to the center of the first pin 6, the space between the first and second roller 1 and 2 is changed within the range $L \pm \Delta L$ by rotating the first pin 6. The tension of the wire-like member 3 can be easily adjusted by adjusting the space between the first and second roller 1 and 2 within the range $L \pm \Delta L$.

After the first pin 6 is freely rotated by loosening the setting means 10, the wire-like member 3 is then introduced to the second nozzle 18 through the space between the first roller 1 and the second roller 2 that is larger than the diameter of the wire-like member 3.

The pushing portion 15a of the spindle 15 pushes the protruding portion 6b of the first pin 6 by rotating the spindle 15, and the first pin 6 rotates, since the pushing portion 15a of the spindle 15 is always in contact with the protruding portion 6b of the first pin 6 by means of the coil spring 9. Accordingly, the space between the first and second rollers 1 and 2 is adjusted in accordance with the rotation of the spindle 15. After the space is set to a predetermined amount, the first pin 6 is prevented from rotating by the fixing means 10.

Figure 7:
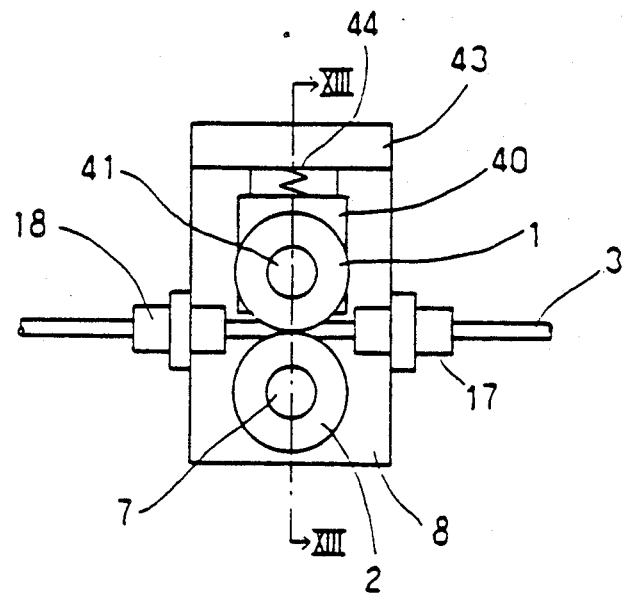
FIG. 7 is a plan view of the second embodiment of the present invention.
Figure 8:
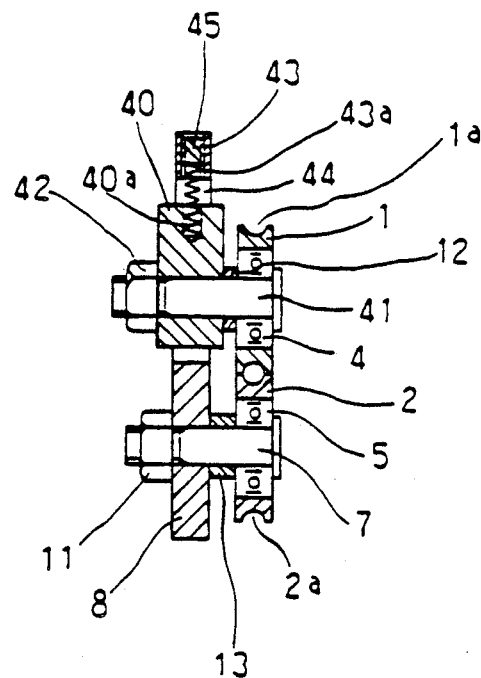
FIG. 8 is a section taken on line VIII—VIII in FIG. 7.

FIGS. 7 and 8 show the second embodiment of tension apparatus. The first shaping roller 1 is rotatably mounted on one end of a first pin 41 through the bearing 4. The first pin 41 is provided on a slider 40 which is slidably supported within the plate 8. A hole portion 40a is formed on the upper surface of the slider 40.

A block 43 which is mounted on the upper side of the plate 8 has a screw hole 43a which faces toward the hole portion 40a of the slider 40. A spring 44 is inserted between the the hole portion 40a of the slider 40 and the screw hole 43a of the block 43. An adjusting means 45 is inserted into the screw hole 43a so that a compressed force of the spring 44 between the hole portion 40a of the slider 40 and the adjusting means 45 is adjusted in accordance with the movement of the adjusting means 45.

The wire-like member 3 guided by the first nozzle 17 is introduced to the second nozzle 18 through the space between the first and second rollers 1 and 2. When the wire-like member 3 is fed through the space between the first and second rollers 1 and 2, the wire-like member 3 is deformed between the first and second roller 1 and 2 by the compressed force of the spring 44. Accordingly, the deformed amount of the wire-like member 3 is maintained at a predetermined amount by adjusting the compressed force of the spring 44 in accordance with the rotation of the adjusting means 45.

Figure 9:
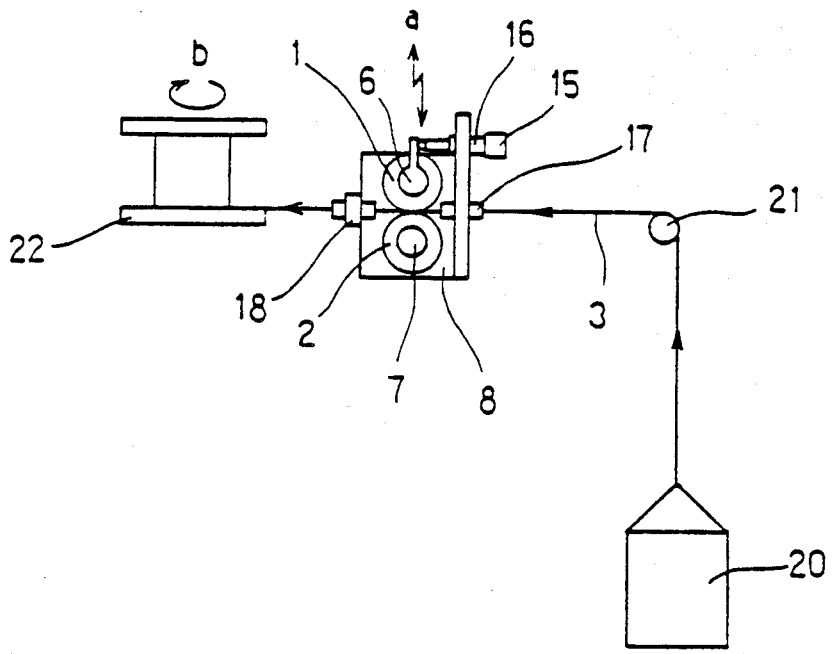
FIG. 9 is a plan view of a winding apparatus having the tension apparatus of the first embodiment of the present invention.

FIG. 9 shows a winding apparatus having the above-mentioned tension apparatus. The end portion of the wire-like member 3, the sectional shape of which is circular, and which is uncoiled from the drum 20 is conveyed toward the guide nozzle 17. After the wire-like member passes through the guide nozzle 17, is then introduced to the guide nozzle 18 through the space between the first shaping roller 1 and the second roller 2, the end portion of the wire-like member 3 being connected to a bobbin 22. The wire-like member 3 is wound on the bobbin 22, since the bobbin 22 is rotated by a motor (not shown) and since the plate 8 is transferred along with the arrow a by a traversing mechanism (not shown). At this time, the predetermined tension is imposed on the wire-like member 3 between the bobbin 22 and the rollers 1 and 2.

In our invention, since the tension is adjusted by the deforming amount of the wire-like member 3, the diameter of the rollers 1 and 2 can be reduced to about 18 mm and the inertia moment becomes about $1 \times 10^{-5}$(kg·cm·S$^2$) which is about 1/100 in comparison with the inertia moment ($1 \times 10^{-3}$ kg·cm·S$^2$) of the prior art. The distance between the rollers 1 and 2 and the second guide nozzle 18 can be reduced to about 3 cm. The amplitude which is generated by the vibration of the wire-like member 3 is small. After all, the change of the tension can be reduced. Furthermore, since the heat which is generated on the bearings of the rollers 1 and 2 is transmitted to the wire-like member 3 itself, the rollers 1 and 2 can rotate at a high speed. Accordingly, the wire-like member 3 can be rapidly wound on the bobbin 22.

Figure 10:
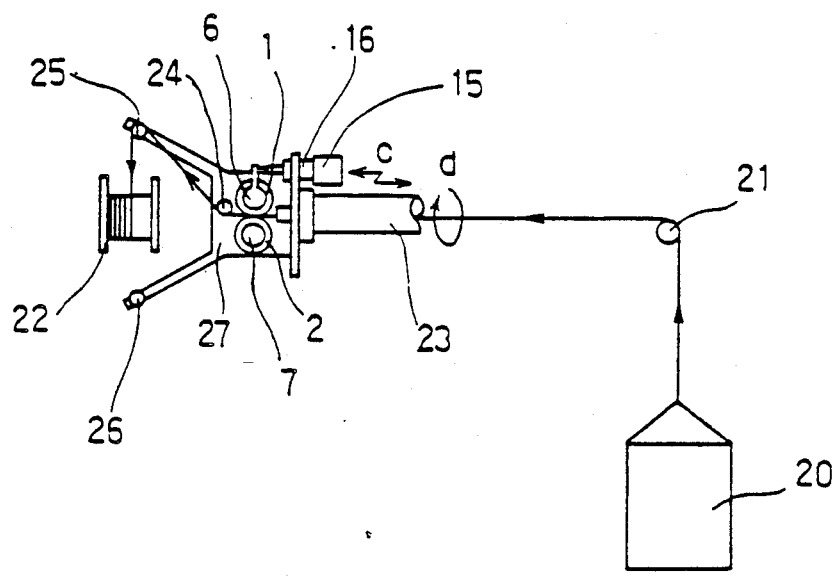
FIG. 10 is a plan view of an another winding apparatus having the tension apparatus of the first embodiment of the present invention.
Figure 11:
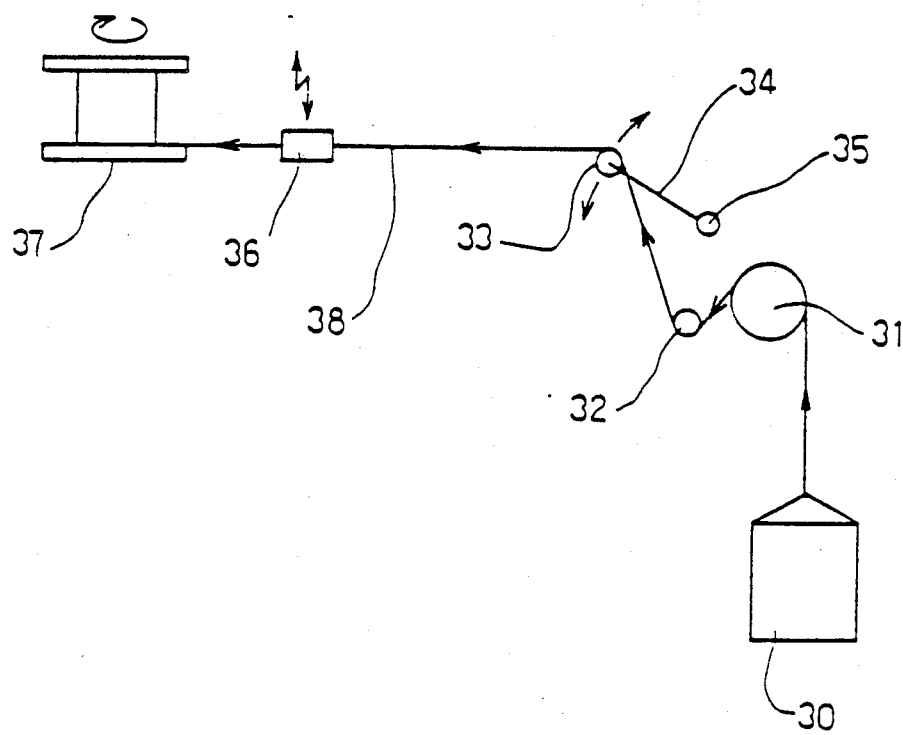
FIG. 11 is a plan view of a prior art apparatus.

FIG. 10 shows a another winding apparatus having the above-mentioned tension apparatus. The end portion of the wire-like member 3 which is uncoiled from the drum 20 is conveyed toward the guide nozzle 23. After the wire-like member passes through the guide nozzle 23, it is then introduced to the pulleys 24 and 25 of the flyer 27 through the space between the first shaping roller 1 and the second roller 2, the end portion of the wire-like member 3 is connected to a bobbin 22. The wire-like member 3 is wound on the bobbin 22, since the bobbin 22 is rotated along the arrow d and is transferred along with the arrow c by a traversing mechanism (not shown). At this time, the predetermined tension is imposed on the wire-like member 3 between the bobbin 22 and the rollers 1 and 2. Since the tension apparatus is small in size, the tension apparatus can be mounted on the flyer 27.

What is claimed is:

1. A tension apparatus for imparting a predetermined tension to a wire-like member coated by an insulating member, comprising:

a pair of shaping rollers facing toward each other for forming a passing space therebetween which is smaller than a diameter of said wire-like member, each of said rollers having an arch-shaped groove on outer perimeter surfaces thereof which deforms an outer surface of said wire-like member passing therethrough to a same shape as a shape of said arch-shaped groove, said groove having a curvature in a range of 0.5 to 1.3 times a diameter of the wire-like member; and supporting means for rotatably supporting said shaping rollers;

wherein said predetermined tension is imparted on said wire-like member by passing said wire-like member through said space between said rollers and by deforming said outer surface of said wire-like member.

2. A tension apparatus for imparting a predetermined tension to a wire-like member coated by an insulating member, comprising:

a first shaping roller supported on a first pin by a bearing, a center of said first shaping roller being eccentric a predetermined amount to a center of said pin, said first shaping roller having an arch-shaped groove on an outer perimeter surface thereof, said groove having a curvature in a range of from 0.5 to 1.3 times a diameter of said wire-like member;

a second shaping roller supported on a second pin by a second bearing, said second shaping roller having an arch-shaped groove on an outer perimeter surface thereof, said groove having a curvature in a range of from 0.5 to 1.3 times a diameter of said wire-like member, said second shaping roller facing toward said first roller in such a manner that a passing space is formed between said arch-shaped groove of said first shaping roller and said arch-shaped groove of said second shaping roller; and adjusting means for adjusting said passing space by rotating said first pin in such a manner that said passing space is smaller than a diameter of said wire-like member so that said first and second shaping rollers deform an outer surface of said wire-like member passing therethrough to a same shape as a shape of said arch-shaped grooves;

wherein the predetermined tension is imparted to said wire-like member by passing said wire-like member through said passing space and by deforming said outer surface of said wire-like member.

3. A tension apparatus claimed in claim 2, wherein:

said first pin has a protruding portion;

said adjusting means is a micrometer which is contact with said protruding portion by a spring means; and said first pin is rotated by moving said protruding portion in accordance with a rotation of said micrometer so that said passing space is adjusted.

4. A tension apparatus for imparting a predetermined tension to a wire-like member coated by an insulating member, comprising:

a first roller having an arch-shaped groove on an outer perimeter surface thereof, said groove having a curvature in a range of from 0.5 to 1.3 times a diameter of said wire-like member;

a second roller having an arch-shaped groove on an outer perimeter surface thereof, said groove having a curvature in a range of from 0.5 to 1.3 times the diameter of said wire-like member;

a first supporting means for rotatably supporting said first roller;

a second supporting means for rotatably supporting said second roller in such a manner that said second roller faces toward said first roller, said second supporting means being slidably provided on said first supporting means; and elastic means for pushing said second supporting means toward said first supporting means in such a manner that a space between said first and second rollers is smaller than the diameter of said wire-like member so that said first and second shaping rollers deform an outer surface of said wire-like member passing therethrough to a same shape as a shape of said arch-shaped grooves;

wherein the predetermined tension is imparted to said wire-like member by deforming said wire-like member through said space between said first and second shaping rollers and by deforming said outer surface of said wire-like member.

5. A tension apparatus claimed in claim 4, wherein:

said elastic means is a spring one end of which is contact with said second supporting means; and further comprising;

a adjusting means which is contact with the other end of said spring for adjusting a compressed force of said spring between said second supporting means and said adjusting means so that said tension imposed on said wire-like member changes in accordance with said compressed force of said spring.

* * * * *